United States Patent [19]
Brandorff

[11] Patent Number: 5,561,274
[45] Date of Patent: * Oct. 1, 1996

[54] APPARATUS FOR WEIGHING OBJECTS

[75] Inventor: Alexander Brandorff, New Milford, Conn.

[73] Assignee: Intel Corporation, Santa Clara, Calif.

[ * ] Notice: The term of this patent shall not extend beyond the expiration date of Pat. No. 5,340,950.

[21] Appl. No.: 146,903

[22] Filed: Nov. 1, 1993

Related U.S. Application Data

[63] Continuation-in-part of Ser. No. 945,224, Sep. 15, 1992.

[51] Int. Cl.$^6$ .................................................. G01G 19/52
[52] U.S. Cl. .................................................. 177/145
[58] Field of Search .................... 177/1, 50, 145, 177/119, 52, 151, 199, 16; 73/1 B

[56] References Cited

U.S. PATENT DOCUMENTS

| | | | |
|---|---|---|---|
| 2,967,703 | 1/1961 | Jones | 177/145 |
| 3,180,475 | 4/1965 | Del Rosso | 177/145 |
| 3,265,140 | 8/1966 | Mayer | 177/52 X |
| 3,299,975 | 1/1967 | Stambera et al. | 177/52 |
| 3,434,595 | 3/1969 | Seaborn et al. | 177/50 X |
| 3,863,725 | 2/1975 | Raynes | 177/52 |
| 4,260,034 | 4/1981 | Randolph, Jr. | 177/211 |
| 4,418,773 | 12/1983 | Finet et al. | 177/16 |
| 4,480,705 | 11/1984 | Raske et al. | 177/50 |
| 4,509,609 | 4/1985 | Meiring | 177/1 |
| 4,550,793 | 11/1985 | Giles | 177/145 |
| 4,611,676 | 9/1986 | Meiring | 177/50 |
| 4,768,600 | 9/1988 | Colvin et al. | 177/50 X |
| 4,788,930 | 12/1988 | Matteau et al. | 177/16 |
| 4,967,857 | 11/1990 | Kent et al. | 177/145 |
| 5,137,099 | 8/1992 | Tolson | 177/145 X |
| 5,178,227 | 1/1993 | Kvisgaard et al. | 177/145 |
| 5,340,950 | 8/1994 | Brandorff et al. | 177/145 |
| 5,347,092 | 9/1994 | Buchs et al. | 177/212 |
| 5,408,054 | 4/1995 | Brandorff et al. | 177/145 |

Primary Examiner—Brian W. Brown
Assistant Examiner—Randy W. Gibson
Attorney, Agent, or Firm—Steve Mendelsohn; William H. Murray

[57] ABSTRACT

A weight sensor generates a load signal representative of the weight of the object as the object approaches, tips over, and leaves the downstream end of a conveyor. A support mechanism preferably provides balancing of the load upon the weight sensor. The weight of the object is determined from the load signal which is preferably adjusted to compensate for various mechanical effects using signals generated by an inclinometer for measuring the angle of inclination of the conveyor, a mechanism for measuring the speed of the object upon the conveyor, and/or an accelerometer for generating signals characteristic of the vibration of the conveyor.

29 Claims, 9 Drawing Sheets

APPARATUS FOR WEIGHING OBJECTS

CROSS-REFERENCES TO RELATED APPLICATIONS

This is a continuation-in-part of co-pending application Ser. No. 07/945,224, filed on Sep. 15, 1992.

BACKGROUND OF THE INVENTION

1. Field of the Invention

The present invention relates to weighing objects, and, in particular, to methods and apparatuses for performing in-line weight measurement of packages on conveyor systems.

2. Description of the Related Art

In the field of package shipping, packages are collected from their sources and transported by truck to distribution centers, where they are unloaded onto conveyor systems for processing, sorting, and eventual distribution to their desired destinations. For auditing and billing purposes, the weight of each package is measured. Conventional procedures for weighing packages require manually removing each package from the conveyor, weighing each package on a separate weighing apparatus, and manually replacing each package onto the conveyor. This is a time-consuming operation that requires excessive handling of the packages.

SUMMARY OF THE INVENTION

The present invention is an apparatus for weighing an object. The apparatus comprises a conveyor for moving the object from an upstream end toward a downstream end of the conveyor. The apparatus also comprises weight-sensing means, positioned at the downstream end of the conveyor, for generating a load signal representative of the weight of the object as the object approaches, tips over, and leaves the downstream end of the conveyor. In addition, the apparatus comprises support means for balancing the load upon the weight-sensing means.

In an alternative preferred embodiment, the present invention is an apparatus for weighing an object comprising a conveyor for moving the object from an upstream end toward a downstream end of the conveyor. The apparatus also comprises weight-sensing means, positioned at the downstream end of the conveyor, for generating a load signal representative of the weight of the object as the object approaches, tips over, and leaves the downstream end of the conveyor. In addition, the apparatus comprises an inclinometer for measuring the angle of inclination of the conveyor, wherein the weight of the object is determined in accordance with the load signal and the angle of inclination.

In another alternative preferred embodiment, the present invention is an apparatus for weighing an object comprising a conveyor for moving the object from an upstream end toward a downstream end of the conveyor. The apparatus also comprises weight-sensing means, positioned at the downstream end of the conveyor, for generating a load signal representative of the weight of the object as the object approaches, tips over, and leaves the downstream end of the conveyor. In addition, the apparatus comprises speed measuring means for measuring the speed of the object upon the conveyor, wherein the weight of the object is determined in accordance with the load signal and the object speed.

In yet another alternative preferred embodiment, the present invention is an apparatus for weighing an object comprising a conveyor for moving the object from an upstream end toward a downstream end of the conveyor. The apparatus also comprises weight-sensing means, positioned at the downstream end of the conveyor, for generating a load signal representative of the weight of the object as the object approaches, tips over, and leaves the downstream end of the conveyor. In addition, the apparatus comprises an accelerometer, mechanically attached to the weight-sensing means, for generating acceleration signals characteristic of the vibration of the conveyor, wherein the weight of the object is determined in accordance with the load signal and the acceleration signals.

DETAILED DESCRIPTION OF THE INVENTION

Figure 1:
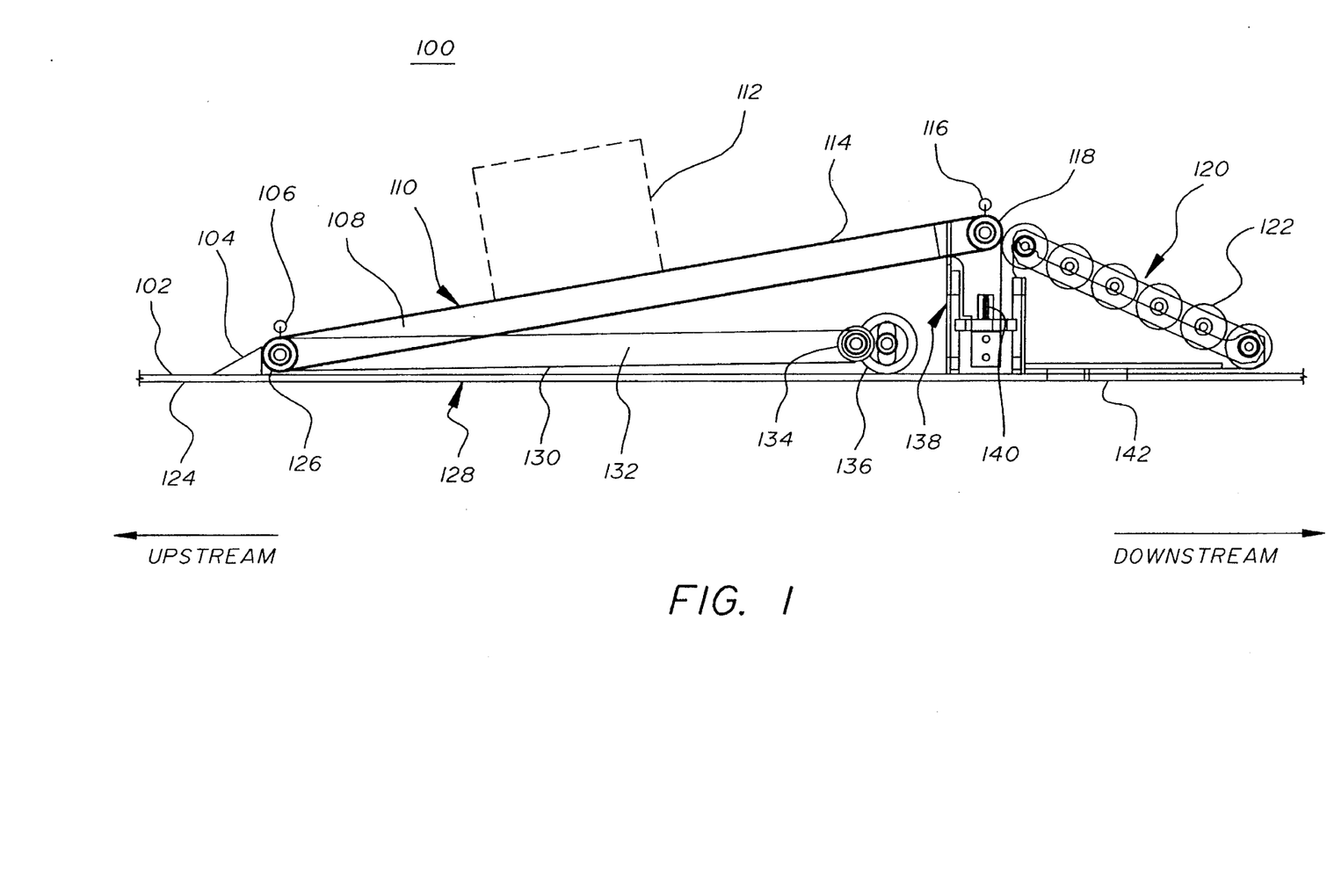
FIG. 1 is a side view in partial cross-section of a preferred embodiment of the present invention for measuring the weight of objects on conveyor system.

Referring now to FIG. 1, there is shown a preferred embodiment of a weighing apparatus of the present invention generally designated 100. Weighing apparatus 100 comprises an inclined conveyor 110 which is pivotally attached at its upstream end to a timing belt frame 132. The downstream end of inclined conveyor 110 rests upon a load sensor 138. Adjacent to the downstream end of inclined conveyor 110 is receiving conveyor 120. The term "upstream" refers to the direction from which packages arrive at weighing apparatus 100; "downstream" refers to the direction to which packages are directed from weighing apparatus 100. In FIG. 1, upstream is to the left and downstream is to the right.

When weighing apparatus 100 is operating, a package 112 is moved downstream on inclined conveyor 110. Inclined conveyor 110 is positively inclined, having its downstream end higher than its upstream end. The downstream end of inclined conveyor 110 is supported by load sensor 138, which generates signals representative of the weight of objects supported by inclined conveyor 110. As package 112 passes over the downstream end of inclined conveyor 110, package 112 tips from inclined conveyor 110 onto receiving conveyor 120. When package 112 is at this tip point, the entire weight of package 112 is supported by the downstream end of inclined conveyor 110. Signals generated by load sensor 138 when the package approaches, tips over, and leaves the tip point are used to determine the weight of package 112. Package 112 tips onto receiving conveyor 120 and proceeds downstream. Receiving conveyor 120 is negatively inclined, having its downstream end lower than its upstream end. Package 112 forms no part of the present invention.

In a preferred embodiment, weighing apparatus 100 is a portable device that may be placed onto conveyor system 128. Conveyor system 128, which forms no part of the present invention, may be a conveyor belt that extends into a tractor trailer for loading and unloading packages. Conveyor system 128 includes conveyor bed 124 and conveyor belt 102. Conveyor bed 124 provide support for weighing apparatus 100, which straddles conveyor belt 102. Magnets 142 on weighing apparatus 100 hold weighing apparatus 100 in place onto metallic conveyor bed 124. Spring-loaded scrub wheels 136 are biased against conveyor belt 102, so that, as conveyor belt 102 moves downstream, conveyor belt 102 drives scrub wheels 136 (counterclockwise in FIG. 1). Scrub wheels 136 drive timing belt 130 supported by timing belt frame 132 (clockwise in FIG. 1) through transmission 134. Timing belt 130 drives upstream roller 126, which in turn drives inclined conveyor belt 114 over and up positively inclined support plate 108 of inclined conveyor 110. Transmission 134, which consists of a set of matched gears (not shown) for speed correction, ensures that the speed of inclined conveyor belt 114 matches the speed of conveyor belt 102. Inclined conveyor belt 114 contains an integral v-belt (not shown) bonded to its underside that rides in grooves in upstream roller 126 and downstream roller 118 to insure belt tracking.

Load sensor 138, which supports the downstream end of inclined conveyor 110, may include load cell 140, which generates electrical signals representing the weight supported by load sensor 138. These electrical signals are transmitted to a signal processor (not shown) which converts the signals into weight measurements. The upstream end of receiving conveyor 120 is adjacent to and slightly lower than the downstream end of inclined conveyor 110. Receiving conveyor 120 includes passive gravity rollers 122.

In a preferred embodiment, weighing apparatus 100 includes an electrical generator (not shown) for transforming kinetic energy from scrub wheels 136 into electricity. In this preferred embodiment, both the mechanical power for driving the moving components of weighing apparatus 100 and the electrical power for operating the electrical components of weighing apparatus 100 are "picked off" conveyor belt 102 by scrub wheels 136. Weighing apparatus 100 thus requires no independent power source for operation. In an alternative preferred embodiment, weighing apparatus 100 may include a battery (not shown) for powering the electrical components.

As package 112 arrives at weighing apparatus 100 from upstream, nose piece 104 scoops package 112 off conveyor belt 102 onto inclined conveyor belt 114. Inclined conveyor belt 114 moves package 112 up inclined conveyor 110 toward the downstream end of inclined conveyor 110. As package 112 proceeds along inclined conveyor 110, the percentage of the weight of package 112 that is supported at the downstream end of inclined conveyor 110 gradually increases until the center of gravity of package 112 reaches the downstream end. At this tip point, package 112 is momentarily balanced over downstream roller 118 and load sensor 138 supports the entire weight of package 112. The signals generated by load sensor 138 when package 112 approaches, tips over, and leaves this tip point are the signals generated for package 112 and are used to determine the weight of package 112.

Package 112 then tips over the downstream end of inclined conveyor 110 and is received onto gravity rollers 122 of receiving conveyor 120, which allows package 112 to return to conveyor belt 102 for continued travel upstream. Receiving conveyor 120 is vibrationally isolated from inclined conveyor 110 to minimize any mechanical noise after package 112 has been weighed. Since weighing apparatus 100 weighs packages as they tip over the downstream end of inclined conveyor 110, weighing apparatus 100 can weigh packages that are larger than weighing apparatus The signal processor (not shown) receives, analyzes, and processes signals from load sensor 138 to determine the weight of package 112. Since load sensor 138 supports both package 112 and inclined conveyor 110, the tare weight of inclined conveyor 110 is subtracted from the load sensor signals to generate net load signals representative of the force exerted by package 112 onto load sensor 138. Because load sensor 138 is not mechanically isolated from inclined conveyor 110 or from receiving conveyor 120, the net load signals contain noise and are therefore preferably filtered by the signal processor in determining the weight of package 112.

Figure 5:
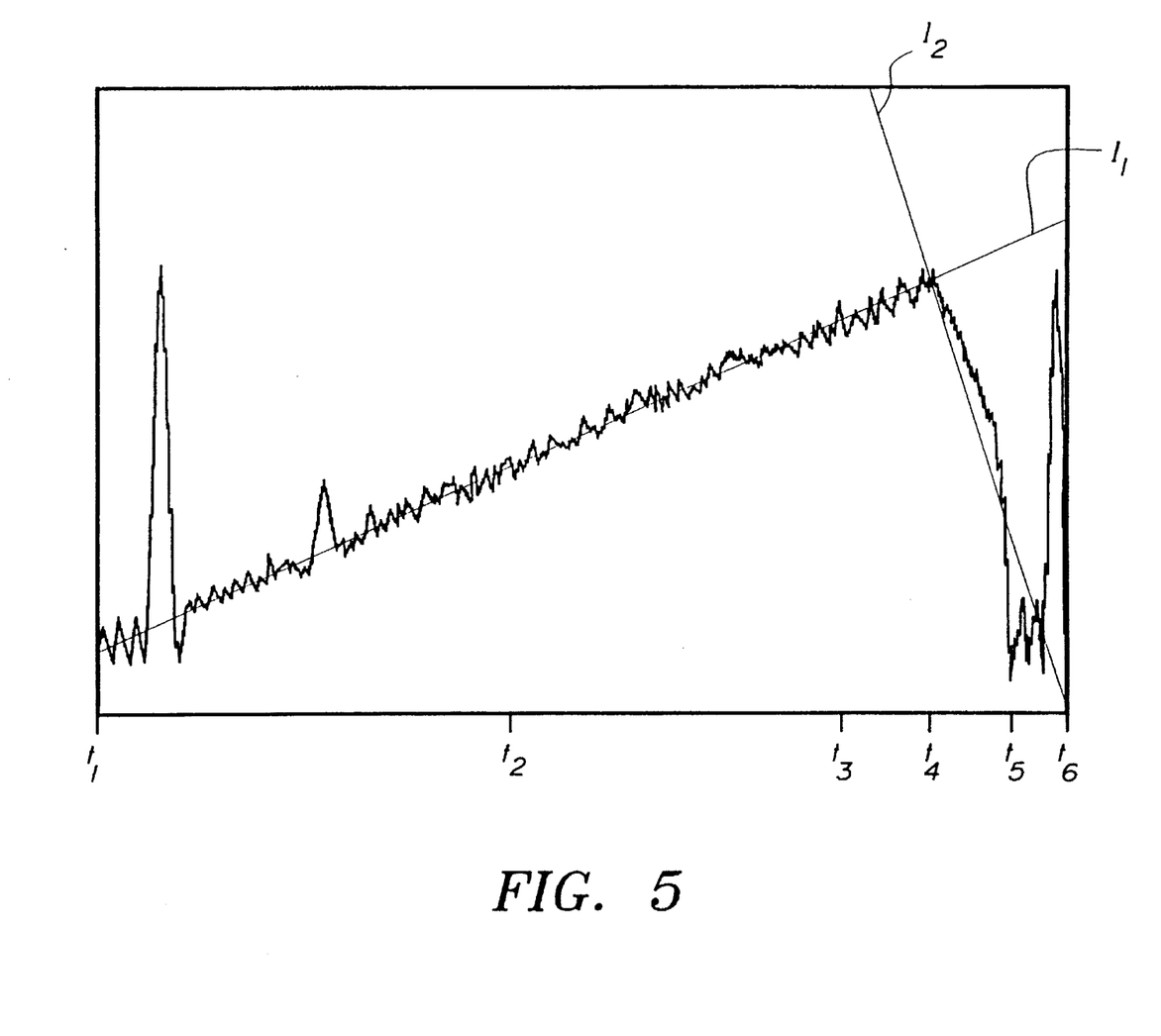
FIG. 5 is a graphical representation of the load sensor signals as a function of time as a package is weighed.

Referring now to FIG. 5, there is shown a graphical representation of the signals generated by load sensor 138 as a function of time for package 112. Prior to time $t_1$, package 112 begins to enter inclined conveyor 110 at nose piece 104. As package 112 proceeds along and up inclined conveyor 110 towards the tip point, the signals generated by load sensor 138 increase as the force exerted by package 112 onto load sensor 138 increases. Near time $t_4$, package 112 reaches the tip point. The signals generated by load sensor 138 then begin to decrease, as package 112 falls onto receiving conveyor 120.

In order to compensate for the signal noise, the following preferred two-line least-squares fit analysis is implemented. Load sensor signals are continuously sampled, for example, every 2 milliseconds. Each sampled signal corresponds to a value representing the tare weight of inclined conveyor 110 plus the force exerted by package 112 onto load sensor 138. After sampling n consecutive values with magnitudes greater than a specified threshold, the sampled signals are stored. In a preferred embodiment, n is 20 and the specified threshold is one pound greater than the scale tare weight. Thus, storage of sampled signals preferably begins as soon as 20 consecutive signals greater than 1 pound above the scale tare weight are sampled. This is represented as time $t_1$ in FIG. 5. The sampled signals are stored until 20 consecutive signals less than the specified threshold are sampled, represented as time $t_6$.

After collecting the signals, the raw signal data is digitally processed through a software low-pass filter to remove high-frequency noise spikes. The peak value of the filtered data is identified as corresponding to the approximate time (time when the tip occurred. In FIG. 5, time $t_2$ represents the point in time half way between time $t_1$ and time $t_4$, and time $t_3$ represents the 90% point in that time interval. Time $t_5$ represents the point in time when the filtered signal value falls to 50% of the peak value at time $t_4$. A least-squares fit is performed on the raw signal data between times $t_2$ and $t_3$ to generate a first line $l_1$. Similarly, a least-squares fit is performed on the raw signal data between times $t_4$ and $t_5$ to generate a second line $l_2$. The point where lines $l_1$ and $l_2$ intersect is then selected to represent the weight of package 112 (after subtracting the scale tare weight).

By using this two-line least-squares fit analysis, the weight of package 112 can be determined avoiding the disadvantages associated with conventional methods for determining package weights. With conventional scales, the full weight of the package is typically on the scale for a relatively long period of time (i.e., seconds). In such case, it is possible to pass the signal from the weight sensor through a very low-pass filter, or simply to sample the signal digitally and average the data over a period of time, or a combination of both.

Such conventional methods present difficulties for weighing apparatus 100 of the present invention. Averaging is not feasible since the force on load sensor 138 is constantly changing, first increasing as package 112 climbs inclined conveyor 110, then decreasing after it reaches the tip point. The full weight of package 112 is carried by load sensor 138 only very briefly (approximately 20 milliseconds for an average rigid package). If the weight were to be determined by simply measuring the load cell signal at the instant the package tips (as with a peak detector), the accuracy would be very dependent on the noise present at that instant. The two-line least-squares fit analysis uses the load cell signals as the package approaches and leaves the tip point to reconstruct what the signal at the tip point would have looked like in the absence of noise. As a result, the sensitivity to noise is reduced and the accuracy improved.

Low-pass filtering may be used to filter out a large portion of the noise. However, the filter needs to be very low-pass in order to filter out the noise associated with conveyor systems. Such a very low-pass filter tends to decrease the signals corresponding to the tip point, which occurs relatively quickly. The result is a scale that tends to weigh low. This can be compensated for by performing a dynamic calibration in which a known weight is run over the scale and then determining an adjustment factor from the decreased signal generated for the known weight. This adjustment factor can then be applied during operation of the scale. One major drawback to this system is that the adjustment factor varies with the speed of the conveyor system.

Another disadvantage of the conventional low-pass filter is that the scale would generate different weight values for two packages with the same weight but different size. The longer package would tend to weigh heavier than the shorter package, because the load sensor signals generated for the longer package would rise more gradually, resulting in less signal phase shift and attenuation upon filtering.

The preferred two-line least-squares fit analysis avoids these problems associated with conventional low-pass filtering typically used in conjunction with conventional scales. Those skilled in the art will understand that alternative embodiments of the two-line least-squares fit analysis of the present invention may be based on sets of signal data other than those specifically described. It will also be understood that the signal processor of the present invention may implement these preferred algorithms in either software or hardware.

In a preferred embodiment, photoswitches 106 and 116 of weighing apparatus 100 provide the capability for measuring the weight of non-rigid packages, such as bags, as well as rigid packages. When photoswitch 106 indicates that a non-rigid package is completely on weighing apparatus 100, the output of load sensor 138 is measured. The output of load sensor 138 is again measured when the non-rigid package just reaches the downstream end of weighing apparatus 100 as indicated by photoswitch 116. The package weight and the location of the package center of gravity may then be calculated. Note that photoswitches 106 and 116 are not necessarily required for this analysis, since any two points on line $1_1$ between time $t_1$ and time $t_4$ of FIG. 5 could be used to determine distances $d_1$ and $d_2$ in Equations (1) and (2) below.

Figure 2:
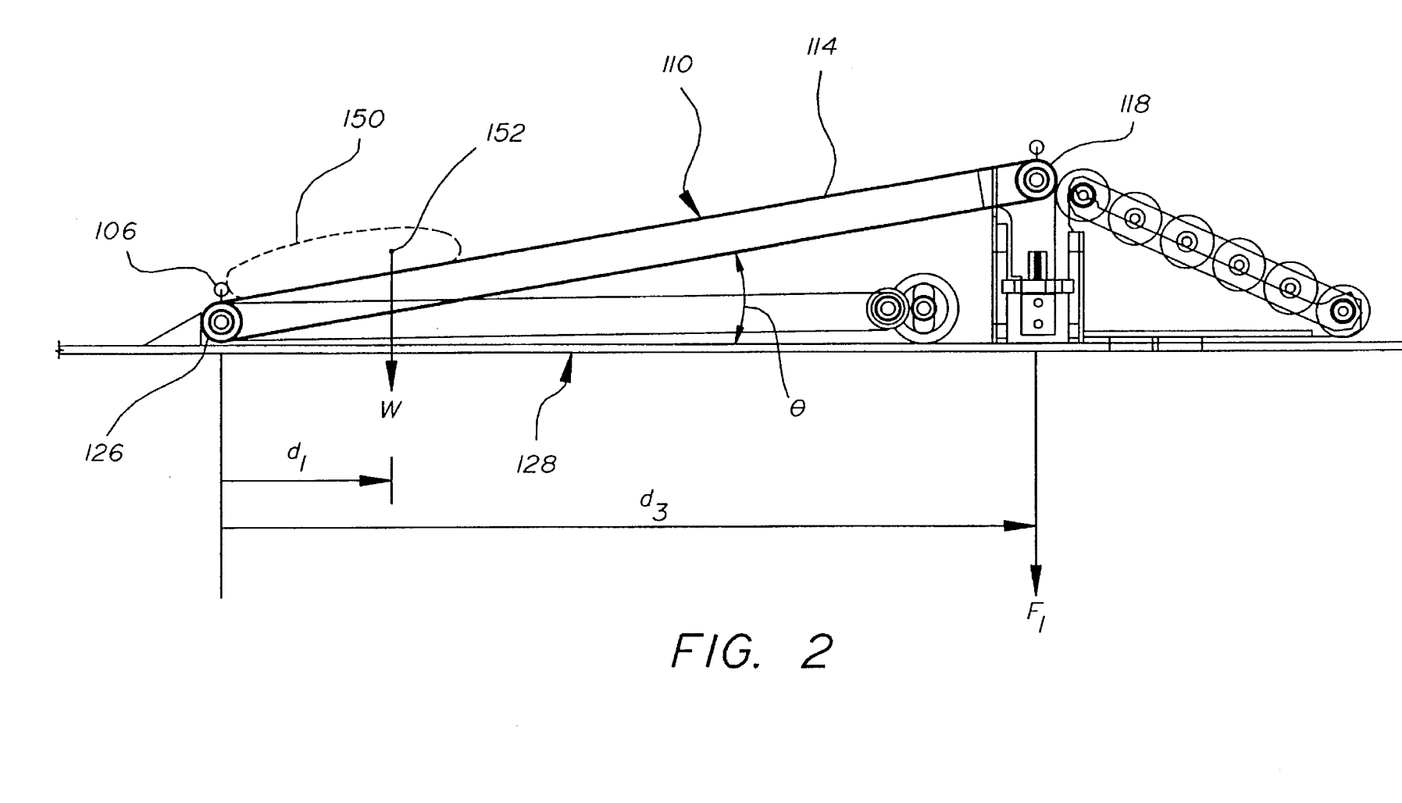
FIGS. 2 and 3 are shown cross-section side views of the preferred embodiment of FIG. 1 demonstrating a method of weighing non-rigid package.

Referring now to FIGS. 2 and 3, there are shown cross-section side views of weighing apparatus 100 that demonstrate the method of weighing non-rigid packages. At time $t_1$, as presented in FIG. 2, photoswitch 106 indicates that non-rigid package 150 is completely on weighing apparatus 100. At this time, the center of gravity 152 of package 150 is a horizontal distance $d_1$ from upstream roller 126. At time $t_1$, the first load sensor reading $F_1$ is recorded, such that:

$$W \times d_1 = F_1 \times d_3, \tag{1}$$

where W is the weight of package 150 and $d_3$ is the horizontal distance from upstream roller 126 to load sensor 138.

Figure 3:
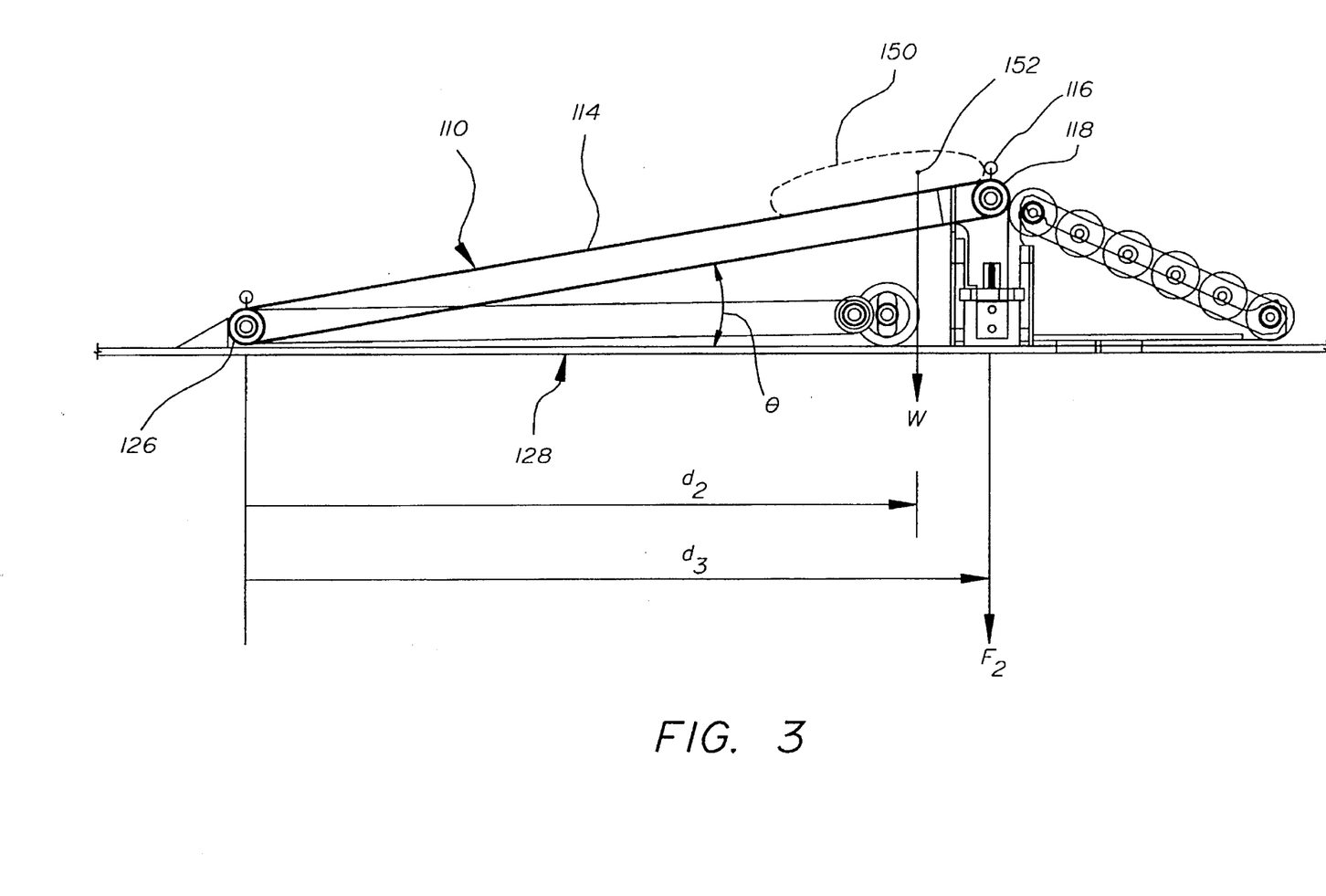

At time $t_2$, as presented in FIG. 3, photoswitch 116 indicates that non-rigid package 150 has just reached the downstream end of weighing apparatus 100. At this time, the center of gravity 152 of package 150 is a horizontal distance $d_2$ from upstream roller 126. At time $t_2$, the second load sensor reading $F_2$ is recorded, such that:

$$W \times d_2 = F_2 \times d_3. \tag{2}$$

The measured duration $\Delta t$ between times $t_1$ and $t_2$ is related to the horizontal distances $d_1$ and $d_2$ by:

$$d_2 - d_1 = v \cdot \Delta t \cdot \cos\theta, \tag{3}$$

where v is the known velocity of inclined conveyor belt 114 and θ is the inclination angle between conveyor system 128 and inclined conveyor 110.

Solving the three equations (1), (2), and (3) for the three unknowns W, $d_1$, and $d_2$ yields:

$$W = \frac{d_3 (F_2 - F_1)}{v \cdot \Delta t \cdot \cos\theta}, \tag{4}$$

$$d_1 = \frac{v \cdot \Delta t \cdot \cos\theta \cdot F_1}{F_2 - F_1}, \tag{5}$$

and $$d_2 = \frac{F_2 d_1}{F_1}. \tag{6}$$

Figure 4:
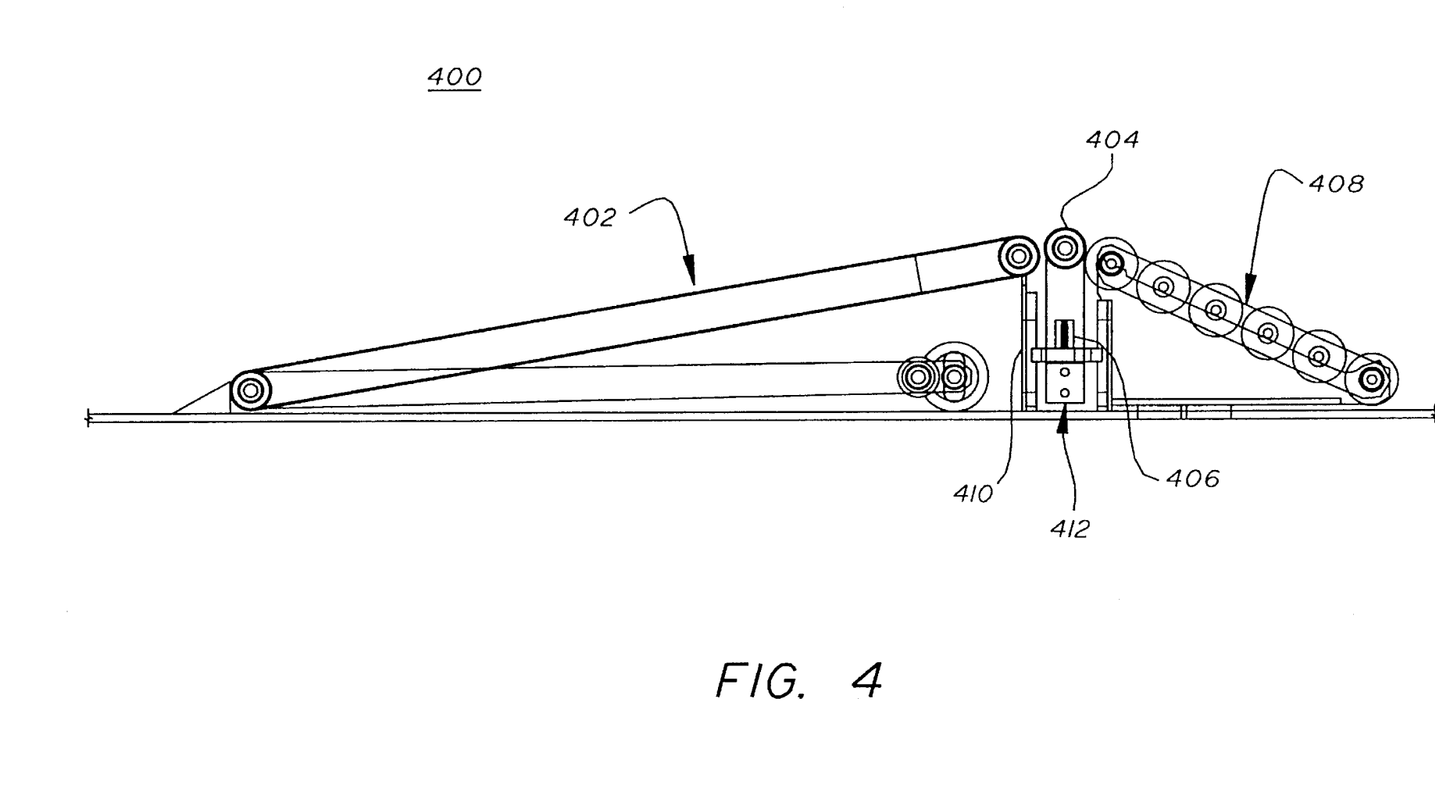
FIG. 4 is a side view in partial cross-section of an alternative preferred embodiment of the present invention for measuring the weight of objects on a conveyor system.

Referring now to FIG. 4, there is shown a cross-section side view of weighing apparatus 400, an alternative embodiment of the present invention. Weighing apparatus 400 differs from weighing apparatus 100 of FIG. 1 in that inclined conveyor 402 is supported by support 410 instead of by load sensor 412. Load sensor 412 includes weighing roller 404, which is supported by two load cells 406. A package is weighed as it tips from inclined conveyor 402, over weighing roller 404, and onto receiving conveyor 408. Since load sensor 412 does not support inclined conveyor 402, little or no space is required between packages.

Load Cell Auto-Balancing

As suggested in FIG. 1, in some preferred embodiments of the present invention, the downstream end of the inclined support plate 108 of inclined conveyor 110 is directly suspended from two load cells 140 on either side of weighing apparatus 100. If a package 112 were to travel on one side of the platform, the load cell on that side would tend to bear more of the load than the other load cell. Since load cells typically are manufactured with slightly different sensitivities, weighing apparatus 100 may generate slightly different weight values for the same package 112 depending on the side-to-side position of package 112 on the inclined conveyor 110.

In addition, if weighing apparatus 100 were mounted on a conveyor system 128 that was not sufficiently flat and/or horizontal, one load cell 140 may carry more of the load than the other load cell 140. As such, weighing apparatus 100 might generate slightly different weight values for the same package 112 depending upon the surface upon which weighing apparatus 100 is mounted.

Figure 6:
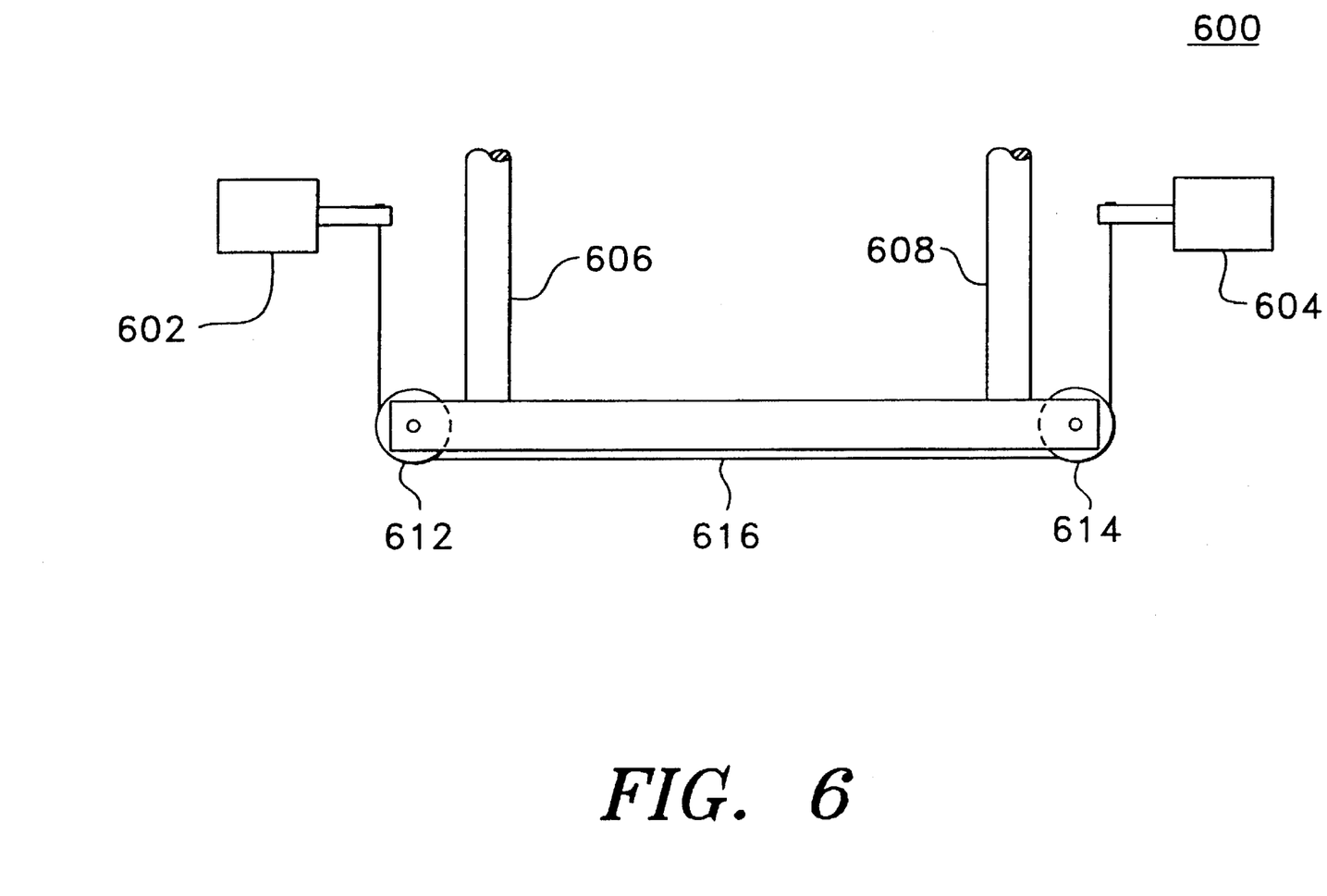
FIG. 6 shows a support mechanism for automatically balancing the load seen by the load cells of a weighing apparatus according to a preferred embodiment of the present invention.

Referring now to FIG. 6, there is shown a support mechanism 600 for automatically balancing the load seen by the load cells 602 and 604 of a weighing apparatus according to an alternative preferred embodiment of the present invention. Support mechanism 600 comprises load arms 606 and 608, support arm 610, pulleys 612 and 614, and cable 616.

Substantially vertical load arms 606 and 608 support opposite sides of the downstream end of the inclined conveyor (not shown in FIG. 6) of the weighing apparatus. Load arms 606 and 608 are in turn supported by substantially horizontal support arm 610. Pulleys 612 and 614 are rotationally connected at opposite ends of support arm 610. Continuous cable 616 runs from one load cell 602, under pulleys 612 and 614, and to the other load cell 604. Load cells 602 and 604 are in turn supported by mechanical ground (e.g., metallic conveyor bed 124 of FIG. 1).

Support mechanism 600 operates to maintain the load evenly distributed between load cells 602 and 604 no matter what the side-to-side position of a package on the inclined conveyor. Those skilled in the art will understand that, since the tension is the same throughout cable 616, load cells 602 and 604 always see equal loads. Moreover, if one load cell is higher than the other (e.g., due to mounting the weighing apparatus on a non-flat surface), support mechanism 600 allows support arm 610 to remain horizontal thereby maintaining equal loads in load cells 602 and 604. It will also be understood by those skilled in the art that support mechanism 600 removes the need for re-balancing load cells 602 and 604 after mounting the weighing apparatus on a conveyor system.

The distances between load arm 606 and load cell 602 and between load arm 608 and load cell 604 are preferably kept small to maintain a stiff connection between the load arms and the load cells. This stiff connection is also provided by the axial loading of support arm 610.

In an alternative preferred embodiment of the present invention, one of the two load cells is replaced by a fixed support. In such a preferred embodiment, support mechanism 600 ensures that the remaining load cell sees half the load supported by the inclined conveyor.

Angle of Inclination Compensation

As depicted in FIG. 1, weighing apparatus 100 is mounted on a flat, horizontal surface. In this orientation, load cells 140 are vertical and therefore see the full vertical component of the weight of package 112. In practice, however, the angle of the mounting surface may vary, causing the orientation of load cells 140 to vary from vertical. Since load cell signals vary with load cell orientation, weighing apparatus 100 may generate slightly different weight values for the same package depending upon the angle of inclination of the mounting surface.

To compensate for this effect, an inclinometer (not shown) is preferably mounted to the weighing apparatus to measure the angle of inclination of the mounting surface (i.e., the deviation of load cell orientation from vertical). The measured angle of inclination may then be used to compensate the load cell signals according to the following equation:

$$F' = F/\cos\theta, \quad (7)$$

where F' is the adjusted load cell signal, F is the raw load cell signal, and θ is the deviation of load cell orientation from vertical.

In a preferred embodiment, the inclinometer is a Midori Inclinometer Part No. PMP-510T, sold by Midori America Corp., Corona, Calif. Those skilled in the art will understand that alternative embodiments of the present invention may employ other mechanisms and methods of measuring inclination angles.

Belt Speed Compensation

Another variable that affects the measured weight of a package is the speed at which the package runs over the weighing apparatus. This is due to the increased lofting of the package from the inclined conveyor at higher belt speeds.

To compensate for this effect, the weighing apparatus of the present invention preferably comprises a means for measuring the speed of the inclined conveyor belt (114 in FIG. 1). In a preferred embodiment, the belt speed measuring means is a Hall-effect sensor connected through the weighing apparatus transmission (134 in FIG. 1). In this embodiment, the Hall-effect sensor is an integral part of the electrical generator of the weighing apparatus and provides three pulses per revolution of the generator shaft. The number of pulses per second is directly proportional to the speed of the inclined conveyor belt and therefore to the speed of the package.

The Hall-effect sensor pulses are also preferably used to trigger an analog-to-digital converter to sets of load cell signals. In this way, a plot of load cell output versus Hall-effect sensor pulses is the same for a given package regardless of the package speed. Any digital filtering is then preferably performed on the load cell signals as a function of Hall-effect sensor pulses (distance traveled by the package) rather than as a function of time.

In a preferred embodiment, the Hall-effect sensor is part of a Pittman Brushless D-C Servomotor distributed by Pittman of Harleysville, Pa. Those skilled in the art will understand that alternative embodiments of the present invention may employ other mechanisms and methods of measuring belt speed, such as encoders, tachometers, etc.

Vibration Compensation

Figure 7:
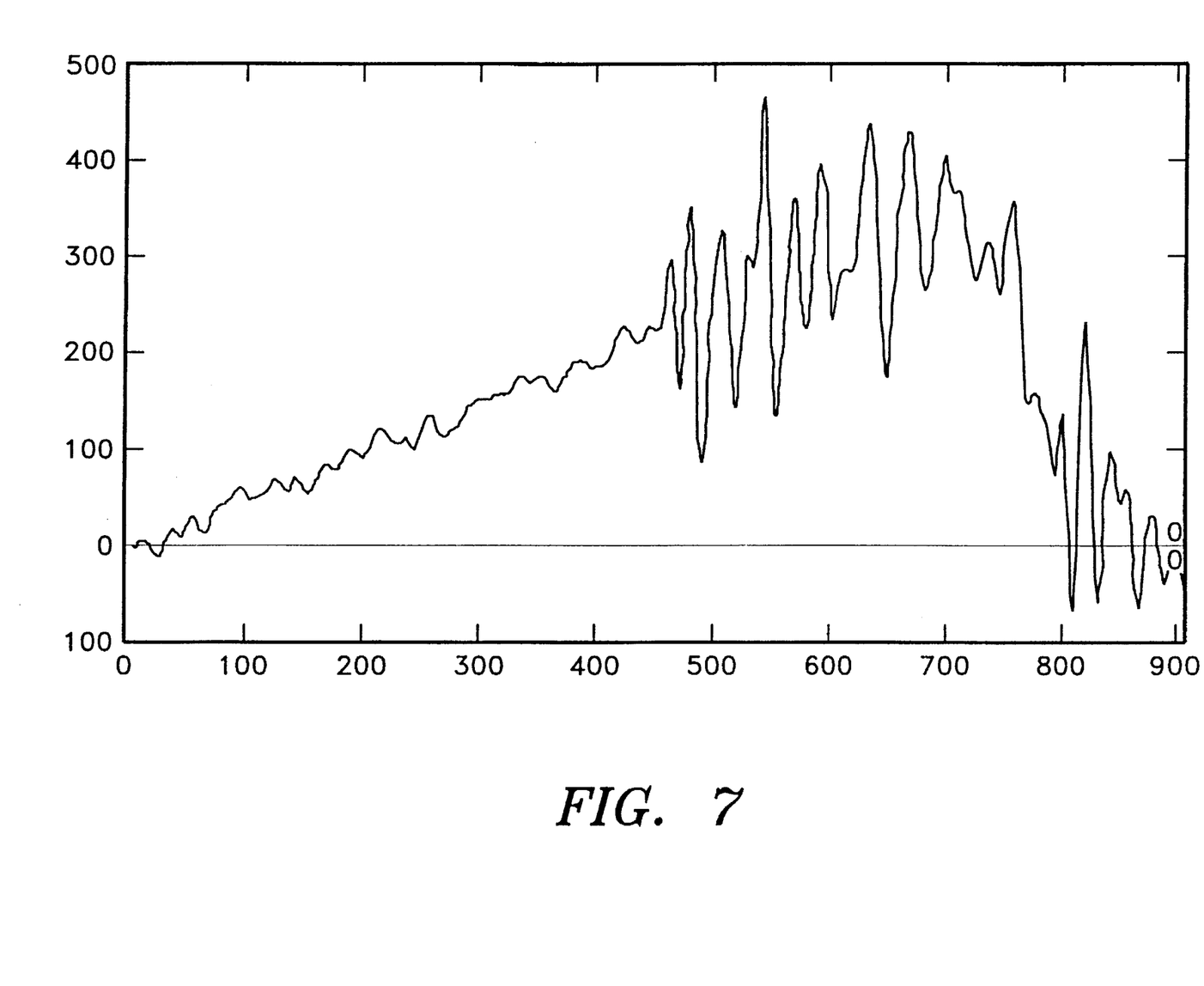
FIG. 7 depicts a load cell signal as a package climbs and tips over the weighing apparatus of FIG. 1 with the addition of vibrational noise caused by dropping a package onto the conveyor system a distance away from weighing apparatus.

Referring again to FIG. 5, there is depicted a representative load cell signal as a package climbs and tips over weighing apparatus 100 of FIG. 1. Referring now to FIG. 7, there is depicted a similar load cell signal with the addition of vibrational noise caused by dropping a package onto conveyor system 128 a distance away from weighing apparatus 100 (at about X=450 in FIG. 7). Digital filtering cannot completely eliminate these vibrational noise effects, since some of the noise frequencies coincide with frequencies in which there is valid package information.

Figure 8:
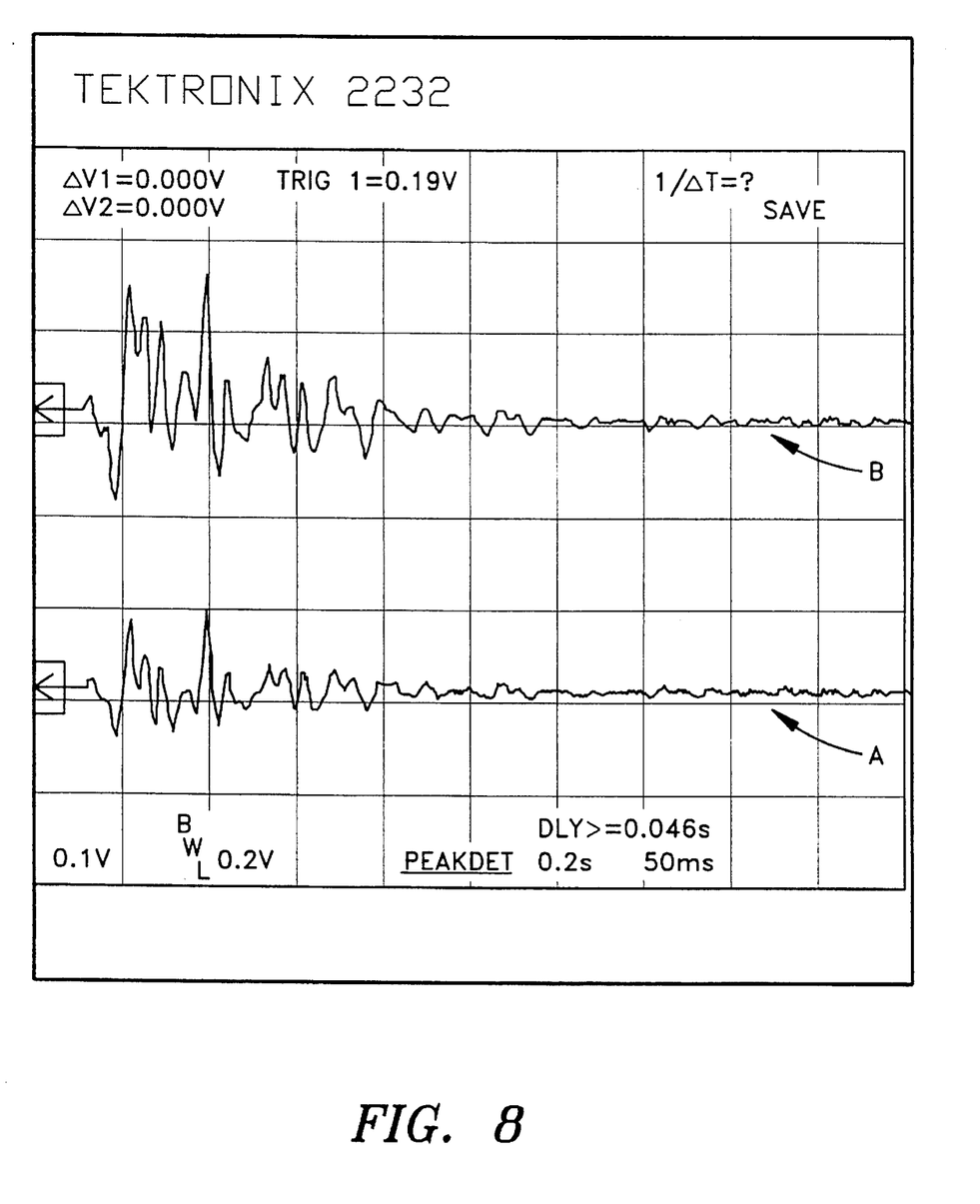
FIG. 8 depicts the raw load cell signal and the accelerometer signal generated in response to a dropped package.

To reduce the effects of such vibrational noise, an accelerometer (not shown) is preferably mounted inside weighing apparatus 100 to measure the amount of vibration transmitted to the weighing apparatus. Referring now to curve A of FIG. 8, there is depicted the load cell signal generated in response to a dropped package. Curve B of FIG. 8 depicts the acceleration signal generated by an accelerometer mounted within the weighing apparatus.

Figure 9:
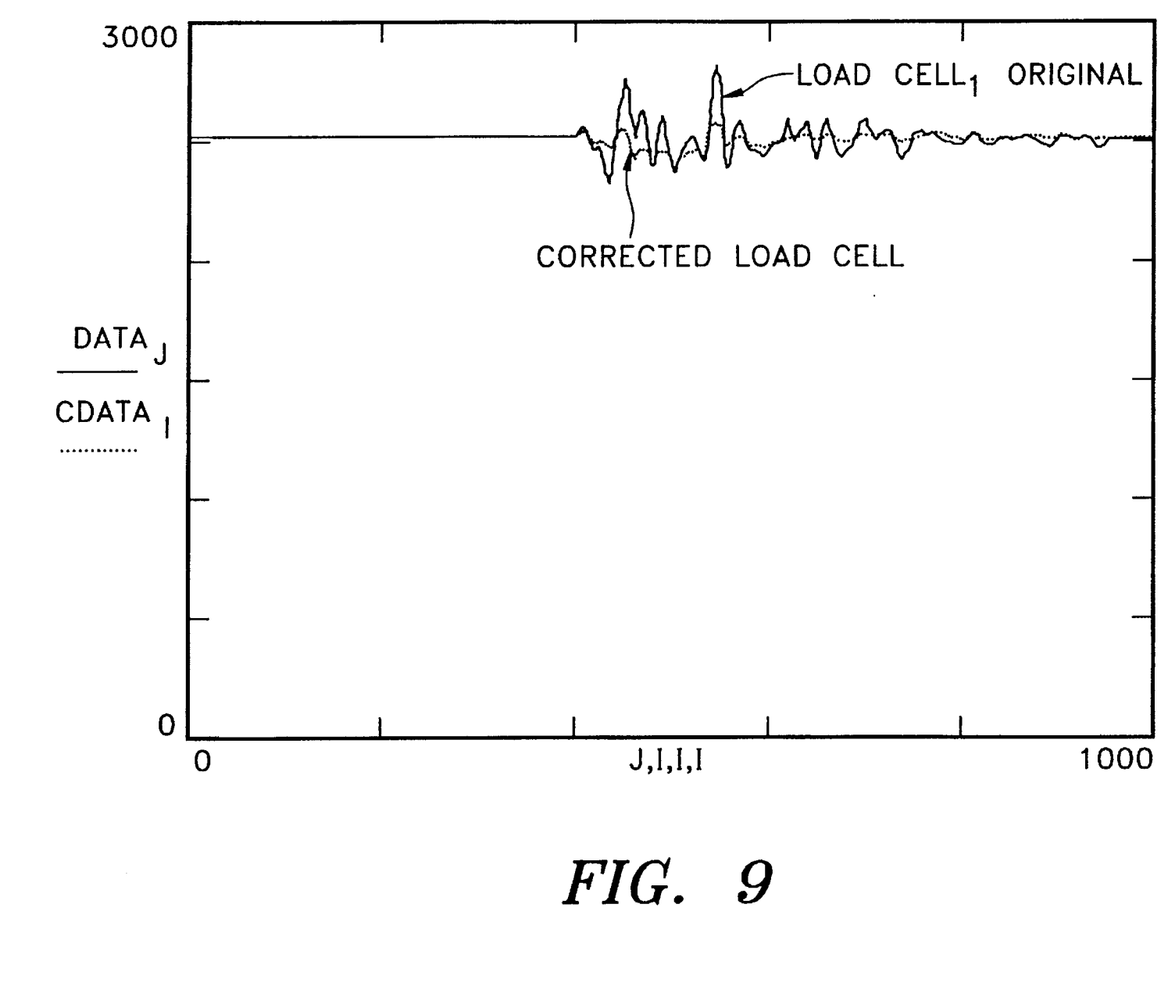
FIG. 9 depicts a raw load cell signal generated in response to a dropped package and the load cell signal that results from adjusting the raw load cell signal using the accelerometer signal.

To compensate for this vibrational noise, the load cell signal is preferably adjusted according to the following equation:

$$F' = \frac{F}{(1+G)}, \quad (8)$$

where F' is the adjusted load cell signal, F is the raw load cell signal, and G is the acceleration in number of g's as derived from the acceleration signals generated by the accelerometer. Referring now to FIG. 9, there is depicted the raw load cell signal F and the adjusted load cell signal F'.

In preferred embodiments, the accelerometer is either an AMP Accelerometer Part No. ACH-01-03 or an AMP Accelerometer Part No. ACH-05-01/4/3-05, sold by AMP Incorporated, Valley Forge, Pa. Those skilled in the art will understand that alternative embodiments of the present invention may employ other mechanisms and methods of measuring vibrational noise.

It will be understood by those skilled in the art that the present invention need not be portable, but rather may form an integral, permanent part of a conveyor system. Those skilled in the art will also understand that the present invention is not limited to conveyor systems. Any means of moving a package to a tip point is within the scope of the present invention. Moreover, the means for moving a package need not be positively inclined. For example, another preferred embodiment of the present invention comprises a negatively inclined chute that is supported at its lower end by a load sensor of some type. Packages may slide under the influence of gravity down the chute to a tip point at the end of the chute. As a package tips over the end of the chute, the load sensor measures the weight of the package. This embodiment may or may not comprise separate means for receiving a package after it leaves the chute.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. An apparatus for weighing an object, comprising:
   (a) a conveyor for moving the object from an upstream end toward a downstream end of said conveyor;
   (b) weight-sensing means, positioned at the downstream end of said conveyor, for generating a load signal representative of the weight of the object as the object approaches, tips over, and leaves the downstream end of said conveyor; and
   (c) support means for balancing the load upon said weight-sensing means.

2. The apparatus of claim 1, wherein said weight-sensing means supports the downstream end of said conveyor.

3. The apparatus of claim 1, wherein said weight-sensing means is separated from the load of the downstream end of said conveyor.

4. The apparatus of claim 1, wherein:
   said weight-sensing means comprises two load cells; and
   said support means comprises:
   (1) two substantially vertical load arms for supporting the object;
   (2) a substantially horizontal support arm for supporting said two load arms;
   (3) two pulleys rotationally attached at opposite sides of said support arm; and
   (4) a cable, connecting said two load cells and running under said two pulleys, for distributing the weight of said package evenly to said two load cells.

5. The apparatus of claim 1, further comprising:
   (d) an inclinometer for measuring the angle of inclination of said conveyor, wherein the weight of the object is determined in accordance with said load signal and said angle of inclination.

6. The apparatus of claim 1, further comprising:
   (d) speed measuring means for measuring the speed of the object upon said conveyor, wherein the weight of the object is determined in accordance with said load signal and the object speed.

7. The apparatus of claim 1, further comprising:
   (d) an accelerometer, mechanically attached to said weight-sensing means, for generating acceleration signals characteristic of the vibration of said conveyor, wherein the weight of the object is determined in accordance with said load signal and said acceleration signals.

8. The apparatus of claim 7, further comprising:
   (e) an inclinometer for measuring the angle of inclination of said conveyor, wherein the weight of the object is determined in accordance with said angle of inclination; and
   (f) speed measuring means for measuring the speed of the object upon said conveyor, wherein the weight of the object is determined in accordance with the object speed.

9. An apparatus for weighing an object, comprising:
   (a) a conveyor for moving the object from an upstream end toward a downstream end of said conveyor;
   (b) weight-sensing means, positioned at the downstream end of said conveyor, for generating a load signal representative of the weight of the object as the object approaches, tips over, and leaves the downstream end of said conveyor; and
   (c) an inclinometer for measuring the angle of inclination of said conveyor, wherein the weight of the object is determined in accordance with said load signal and said angle of inclination.

10. The apparatus of claim 9, wherein said weight-sensing means supports the downstream end of said conveyor.

11. The apparatus of claim 9, wherein said weight-sensing means is separated from the load of the downstream end of said conveyor.

12. The apparatus of claim 9, further comprising:
    (d) support means for balancing the load upon said weight-sensing means.

13. The apparatus of claim 9, further comprising:
    (d) speed measuring means for measuring the speed of the object upon said conveyor, wherein the weight of the object is determined in accordance with the object speed.

14. The apparatus of claim 9, further comprising:
    (d) an accelerometer, mechanically attached to said weight-sensing means, for generating acceleration signals characteristic of the vibration of said conveyor, wherein the weight of the object is determined in accordance with said acceleration signals.

15. An apparatus for weighing an object, comprising:
    (a) a conveyor for moving the object from an upstream end toward a downstream end of said conveyor;
    (b) weight-sensing means, positioned at the downstream end of said conveyor, for generating a load signal representative of the weight of the object as the object approaches, tips over, and leaves the downstream end of said conveyor; and
    (c) speed measuring means for measuring the speed of the object upon said conveyor, wherein the weight of the object is determined in accordance with said load signal and the object speed.

16. The apparatus of claim 15, wherein said weight-sensing means supports the downstream end of said conveyor.

17. The apparatus of claim 15, wherein said weight-sensing means is separated from the load of the downstream end of said conveyor.

18. The apparatus of claim 15, wherein:

said conveyor comprises:

(1) a conveyor belt; and (2) a transmission for driving said conveyor belt, and said speed measuring means is attached to said transmission and generates signal pulses proportional to the rotations within said transmission.

19. The apparatus of claim 18, wherein said weight-sensing means generates a load signal for each signal pulse generated by said speed measuring means.

20. The apparatus of claim 18, wherein said speed measuring means is a Hall-effect sensor.

21. The apparatus of claim 15, further comprising:

(d) support means for balancing the load upon said weight-sensing means.

22. The apparatus of claim 15, further comprising:

(d) an inclinometer for measuring the angle of inclination of said conveyor, wherein the weight of the object is determined in accordance with said angle of inclination.

23. The apparatus of claim 15, further comprising:

(d) an accelerometer, mechanically attached to said weight-sensing means, for generating acceleration signals characteristic of the vibration of said conveyor, wherein the weight of the object is determined in accordance with said acceleration signals.

24. An apparatus for weighing an object, comprising:

(a) a conveyor for moving the object from an upstream end toward a downstream end of said conveyor;

(b) weight-sensing means, positioned at the downstream end of said conveyor, for generating a load signal representative of the weight of the object as the object approaches, tips over, and leaves the downstream end of said conveyor; and (c) an accelerometer, mechanically attached to said weight-sensing means, for generating acceleration signals characteristic of the vibration of said conveyor, wherein the weight of the object is determined in accordance with said load signal and said acceleration signals.

25. The apparatus of claim 24, wherein said weight-sensing means supports the downstream end of said conveyor.

26. The apparatus of claim 24, wherein said weight-sensing means is separated from the load of the downstream end of said conveyor.

27. The apparatus of claim 24, further comprising:

(d) support means for balancing the load upon said weight-sensing means.

28. The apparatus of claim 24, further comprising:

(d) an inclinometer for measuring the angle of inclination of said conveyor, wherein the weight of the object is determined in accordance with said angle of inclination.

29. The apparatus of claim 24, further comprising:

(d) speed measuring means for measuring the speed of the object upon said conveyor, wherein the weight of the object is determined in accordance with the object speed.

* * * * *

UNITED STATES PATENT AND TRADEMARK OFFICE
CERTIFICATE OF CORRECTION

PATENT NO.    :   5,561,274
DATED         :   October 1, 1996
INVENTOR(S)   :   Alexander Brandorff It is certified that error appears in the above-identified patent and that said Letters Patent is hereby corrected as shown below:

Title Page, Assignee: delete "Intel Corporation, Santa Clara, Calif." and insert therefor --United Parcel Service of America, Inc., Atlanta, Ga.--.

Column 8, equation (7): delete "$F^1$" and insert therefor --F'--.

Column 9, equation (8): delete first occurrence of "F" and insert therefor --F'--.

Signed and Sealed this

Fourteenth Day of October, 1997

Attest:

BRUCE LEHMAN

Attesting Officer

Commissioner of Patents and Trademarks